United States Patent
Sutter et al.

(10) Patent No.: US 10,855,978 B2
(45) Date of Patent: Dec. 1, 2020

(54) SYSTEM AND METHOD FOR RECEIVING USER INPUT IN VIRTUAL/AUGMENTED REALITY

(71) Applicant: The Toronto-Dominion Bank, Toronto (CA)

(72) Inventors: Levi Sutter, Westampton, NJ (US); Miguel Navarro, Ewing, NJ (US)

(73) Assignee: The Toronto-Dominion Bank, Toronto (CA)

( * ) Notice: Subject to any disclaimer, the term of this patent is extended or adjusted under 35 U.S.C. 154(b) by 70 days.

(21) Appl. No.: 16/131,647

(22) Filed: Sep. 14, 2018

(65) Prior Publication Data
US 2020/0092537 A1  Mar. 19, 2020

(51) Int. Cl.
*H04N 13/383* (2018.01)
*H04N 13/398* (2018.01)
*H04N 13/344* (2018.01)

(52) U.S. Cl.
CPC ......... *H04N 13/383* (2018.05); *H04N 13/344* (2018.05); *H04N 13/398* (2018.05)

(58) Field of Classification Search
CPC ... H04N 13/383; H04N 13/344; H04N 13/398
See application file for complete search history.

(56) References Cited

U.S. PATENT DOCUMENTS

| | | | |
|---|---|---|---|
| 6,533,417 B1 | 3/2003 | Sain | |
| 8,179,604 B1 * | 5/2012 | Prada Gomez | .... G02B 27/0093 345/8 |
| 8,235,529 B1 * | 8/2012 | Raffle | ..... A61B 3/113 351/209 |
| 10,019,057 B2 * | 7/2018 | Osman | ............... G02B 27/0172 |
| 10,254,544 B1 * | 4/2019 | Melzer | ................. G02B 27/017 |
| 2002/0099257 A1 * | 7/2002 | Parker | ................ G02B 27/0093 600/27 |
| 2007/0048702 A1 * | 3/2007 | Jang | ....................... G09B 19/00 434/224 |

(Continued)

OTHER PUBLICATIONS

SmoothMoves: Smooth Pursuit Head Movements for Augmented Reality, Esteves, A.; Verweij, D.; Suraiya, L.; Islam, R.; Lee, Y.; Oakley, I. Proceedings of the 30th Annual ACM symposium on User Interface Software and Technology; Oct. 2017 ISBN: 978-1-4503-4981-9 DOI: 10.1145/3126594.3126616.

(Continued)

*Primary Examiner* — Peter D Le
(74) *Attorney, Agent, or Firm* — Rowand LLP

(57) ABSTRACT

Reliable detection of input by a virtual-reality or augmented reality system is disclosed. Detection of input by the system may include displaying, via a display device, a stereoscopic rendering of a portion of a three-dimensional virtual environment including targets moving in predictable patterns. The rendering is updated based on movements tracked via a head tracker to show corresponding portions of the three-dimensional virtual environment along a gaze path through it. A first condition is detected if the gaze path corresponds to the movement one of the related targets along its pattern. Input is detected if, following detection of the first condition, it is detected that the gaze path also corresponds to the movement another of the targets along its pattern.

20 Claims, 8 Drawing Sheets

(56) References Cited

U.S. PATENT DOCUMENTS

| | | | | |
|---|---|---|---|---|
| 2008/0024392 A1* | 1/2008 | Gustafsson | G02B 27/017 | 345/8 |
| 2010/0103104 A1* | 4/2010 | Son | G06F 3/014 | 345/158 |
| 2010/0156787 A1* | 6/2010 | Katayama | G02B 27/017 | 345/157 |
| 2010/0204608 A1* | 8/2010 | Sugio | A61B 3/113 | 600/558 |
| 2011/0205167 A1 | 8/2011 | Massengill | | |
| 2012/0194419 A1* | 8/2012 | Osterhout | G02B 27/0093 | 345/156 |
| 2012/0194552 A1* | 8/2012 | Osterhout | G02B 27/0093 | 345/633 |
| 2013/0083011 A1* | 4/2013 | Geisner | G06T 19/006 | 345/419 |
| 2013/0093788 A1* | 4/2013 | Liu | G06F 3/011 | 345/633 |
| 2013/0117696 A1* | 5/2013 | Robertson | G16H 15/00 | 715/763 |
| 2013/0293844 A1 | 11/2013 | Gross | | |
| 2013/0335303 A1* | 12/2013 | Maciocci | G06F 3/011 | 345/8 |
| 2013/0335321 A1* | 12/2013 | Sugita | G06F 3/0488 | 345/157 |
| 2013/0336631 A1* | 12/2013 | Kura | G02B 27/0172 | 386/230 |
| 2014/0055591 A1* | 2/2014 | Katz | G06F 3/013 | 348/78 |
| 2014/0063060 A1* | 3/2014 | Maciocci | G06F 3/011 | 345/633 |
| 2014/0147002 A1* | 5/2014 | Park | G06F 21/32 | 382/103 |
| 2014/0232881 A1* | 8/2014 | Plaehn | H04N 5/23212 | 348/207.1 |
| 2014/0362110 A1* | 12/2014 | Stafford | G06F 3/013 | 345/633 |
| 2015/0062534 A1* | 3/2015 | Massengill | A61B 5/4064 | 351/209 |
| 2015/0084864 A1* | 3/2015 | Geiss | G06F 3/013 | 345/158 |
| 2015/0205494 A1* | 7/2015 | Scott | G06T 19/006 | 345/158 |
| 2015/0220142 A1* | 8/2015 | Parkinson | G06F 3/0482 | 345/157 |
| 2015/0310657 A1 | 10/2015 | Eden | | |
| 2015/0346816 A1* | 12/2015 | Lee | H04N 7/142 | 345/8 |
| 2016/0004320 A1* | 1/2016 | Lundberg | G06K 9/48 | 345/633 |
| 2016/0048204 A1* | 2/2016 | Scott | G06F 3/013 | 345/156 |
| 2016/0171478 A1* | 6/2016 | Kwon | G06Q 20/29 | 705/44 |
| 2016/0224176 A1* | 8/2016 | Kim | G06F 3/0416 | |
| 2016/0282619 A1* | 9/2016 | Oto | G02B 27/017 | |
| 2016/0286164 A1* | 9/2016 | Kratz | H04N 7/15 | |
| 2016/0302713 A1* | 10/2016 | Maruta | A61B 5/04842 | |
| 2016/0334911 A1* | 11/2016 | Kimura | G06F 3/0412 | |
| 2017/0092002 A1* | 3/2017 | Mullins | G06F 3/013 | |
| 2017/0212586 A1* | 7/2017 | Lopez | G06F 1/1626 | |
| 2017/0245753 A1* | 8/2017 | Donaldson | A61B 3/024 | |
| 2017/0318019 A1* | 11/2017 | Gordon | G06K 9/00617 | |
| 2017/0372258 A1* | 12/2017 | Narasimhan | G06Q 10/087 | |
| 2018/0004285 A1* | 1/2018 | Castleman | G06F 3/012 | |
| 2018/0061003 A1 | 3/2018 | Kono | | |
| 2018/0295337 A1* | 10/2018 | Hicks | G06F 3/017 | |

OTHER PUBLICATIONS

Head-slaved tracking in a see-through HMD: The effects of a secondary visual monitoring task on performance and workload, Nelson, W. T.; Bolia, R.; Russell, C.; Morely, R.; Roe, M. Proceedings of the XIVth Triennial Congress of the International Ergonomics Association and 44th Annual Meeting of the Human Factors and Ergonomics Association; 2000.

Prediction of user action in moving-target selection tasks, Casallas, J. Iowa State University Dissertation; 2015.

Modeling Object Pursuit for Desktop Virtual Reality, Liu, L.; Liere, R. IEEE Transactions on Visualization and Computer Graphics, v 18, n 7, Jul. 2012 ISSN: 1077-2626 DOI: 10.1109/TVCG.2012.31.

* cited by examiner

SYSTEM AND METHOD FOR RECEIVING USER INPUT IN VIRTUAL/AUGMENTED REALITY

TECHNICAL FIELD

The present application relates to computer user interfaces and, more particularly, to receiving input from an operator or user of a virtual reality (VR)/augmented reality (AR) device.

BACKGROUND

In virtual reality/augmented reality environments, users may provide input in a variety of manners. For example, a user may gaze at a target for a defined length of time (i.e., "dwell" on that target) to select that target. Use of such gazing as an input method may, however, lead to accidental selections such as, for example, if a user accidentally stares at a target while contemplating how to proceed.

In another example, users may, additionally or alternatively, use input devices to provide indications (e.g., using their hands). However, a VR/AR device may not necessarily provide an input device. Additionally, it may be that the input device is part of a viewing component (e.g., a headset) of the VR/AR device and may be cumbersome to use. Additionally, it may be that having a user interact with an input device may detract from the VR/AR experience.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
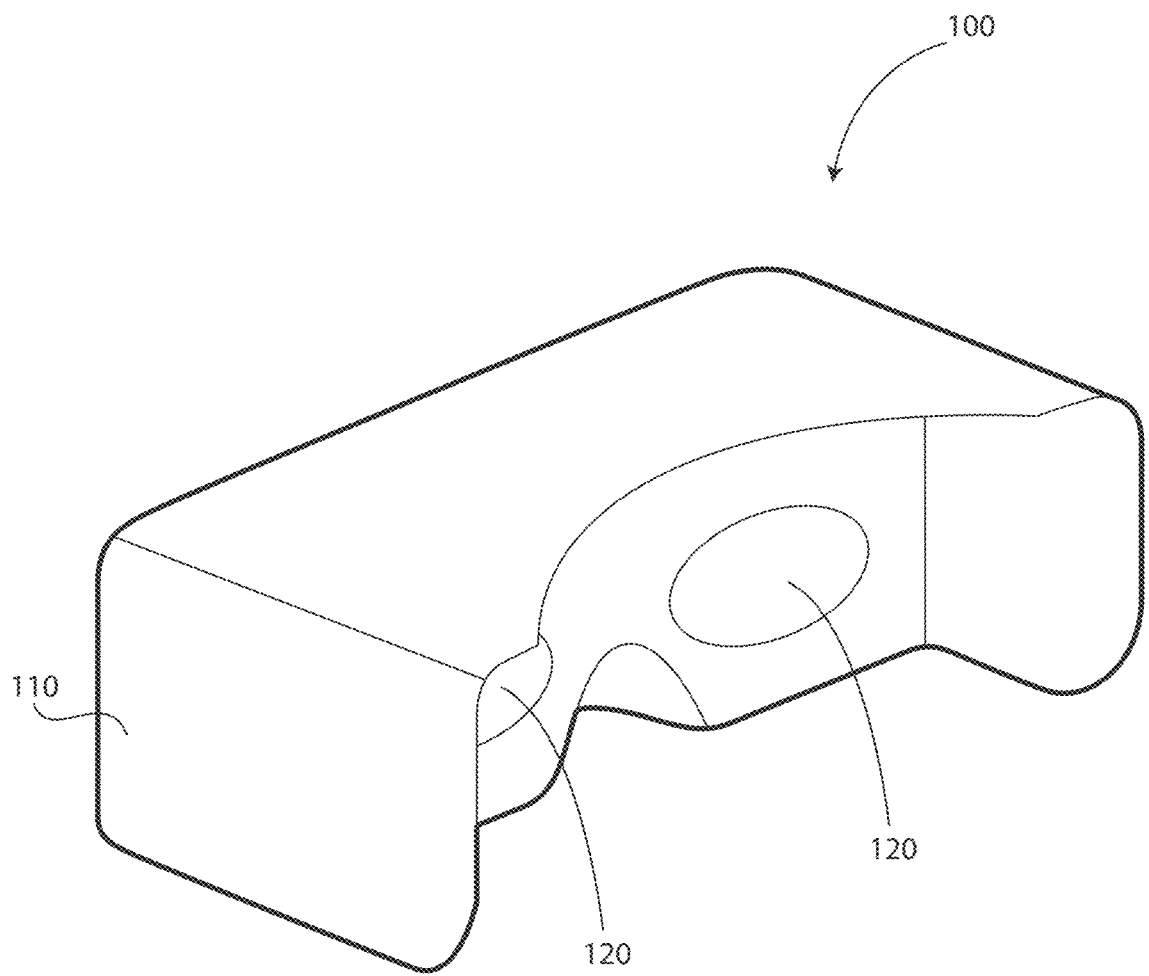
FIG. 1 shows a wearable virtual reality device, exemplary of an embodiment.

According to the subject matter of the present application, there may be provided a computer-implemented method. The method may include displaying, via a display device of a wearable virtual-reality device, a stereoscopic rendering of a portion of a three-dimensional virtual environment including a plurality of related targets, each moving in a respective predictable pattern; updating the displayed stereoscopic rendering based on movements tracked via a head tracker of the virtual-reality device to show corresponding portions of the three-dimensional virtual environment along a gaze path through the three-dimensional virtual environment; detecting a first condition including that first portion of the gaze path through the virtual environment corresponds to the movement of a first one of the related targets along its respective predictable pattern; and following detection of the first condition, detecting a second condition including that a second portion of the gaze path through the virtual environment further corresponds to the movement of a second one of the related targets along its respective predictable pattern, performing an action.

In this way, input may be received from a user of the virtual reality device. Conveniently, such input may be more reliable than other known input methods. Furthermore, ambiguous inputs may be avoided. For example, accidental inputs, such as may occur with gaze tracking if, for example, a user accidentally stares may be avoided. In another example, a computer system as set out about may be contrasted with systems where input detection is based on tracking of a single target. Notably, ambiguous inputs such as could be received with such systems—such as, for example, if a user looking around a virtual world inadvertently tracks a moving target (e.g., when looking around or gazing out of mere curiosity)—may be avoided as a user may be less likely to make such inadvertent motions with respect to multiple targets.

Notably, a suitable virtual reality device may be employed in augmented reality applications and applied to that end. For example, such a virtual reality device may include or be in communication with a camera. As such, the terms virtual reality (VR) and virtual reality device as used in the present application may be considered to include augmented reality and augmented reality devices.

In some implementations, detecting that the first portion of the gaze path corresponds to movement of the first one of the related targets may include determining that the first one of the related targets was maintained in view in the displayed stereoscopic rendering during a time period corresponding to the first portion of the gaze path.

In some implementations, detecting that the second portion of the gaze path corresponds to movement of the second one of the related targets may include determining that the second one of the related targets was maintained in view in the displayed stereoscopic rendering during a time period corresponding to the second portion of the gaze path.

In some implementations, detecting that the first portion of the gaze path corresponds to movement of the second one of the related targets may further include determining that the time period corresponding to the first portion of the gaze path is of at least a minimum duration.

In some implementations, detecting that the second portion of the gaze path corresponds to movement of the second one of the related targets may further include determining that the time period corresponding to the second portion of the gaze path is of at least a minimum duration.

In some implementations, detecting that the first portion of the gaze path corresponds to movement of the first one of the related targets may include determining that the first portion of the gaze path corresponds to a minimum distance in the three-dimensional virtual environment.

In some implementations, detecting that the second portion of the gaze path corresponds to movement of the second one of the related targets may include determining that the second portion of the gaze path corresponds to a minimum distance in the three-dimensional virtual environment.

In some implementations, detecting a correlation between the first portion of the gaze path and the movement of the first one of the related targets may require that the first portion of the gaze path and the movement of the first one of the related targets correspond within a tolerance. Such a tolerance may be configurable.

In some implementations, detecting a correlation between the second portion of the gaze path and the movement of the second one of the related targets may include detecting that the second portion of the gaze path and the movement of the second one of the related targets correspond within a tolerance. Such a tolerance may be configurable.

In some implementations, it may be that the first portion of the gaze path and the second portion of the gaze path do not overlap.

In some implementations, the wearable virtual-reality device may further include an input device and detecting at least one of the first and second conditions may include detecting a confirmatory input via the input device. Detecting the confirmatory input may correspond to detecting a touch, a keypress, and/or voice input.

In some implementations, performing the action may include presenting a video in the three-dimensional virtual environment. For example, the video may correspond to functionality available for enrolment.

In some implementations, the method further includes displaying a prompt as to whether to initiate enrolment in particular functionality; in response to the prompt, receiving an indication to initiate enrolment in the particular functionality; and upon receiving the indication, initiating enrolment in the particular functionality.

In some implementations, the three-dimensional virtual environment is provided via a first software application and enrolment in the particular functionality is provided via a second software application. The second software application may be a mobile banking application.

In some implementations, each of the plurality of related targets is themed. For example, it may be that the theming corresponds to the particular functionality available for enrolment.

In some implementations, the wearable virtual-reality device includes a virtual-reality headset frame and a smartphone mounted in the frame.

According to the subject matter of the present application, there may be provided a computer system configured to perform the above-described method. Such a computer system may include a processor, a wearable virtual-reality device and a memory. The virtual-reality device may include a display device and a head tracker. The virtual-reality device may be coupled to the processor. The memory may be coupled to the process. The memory may store instructions that, when executed by the computer system, cause the computer system to perform the above described method.

In a particular example, there may be provided a computer system including a processor; a wearable virtual-reality device coupled to the processor, the virtual-reality device including a display device and a head tracker; and a memory coupled to the processor storing instructions that, when executed by the computer system, cause the computer system to: display, via the display device, a stereoscopic rendering of a portion of a three-dimensional virtual environment including a plurality of related targets, each moving in a respective predictable pattern; update the displayed stereoscopic rendering based on movements tracked via the head tracker to show corresponding portions of the three-dimensional virtual environment along a gaze path through the three-dimensional virtual environment; detect a first condition including that a first portion of the gaze path through the virtual environment corresponds to the movement of a first one of the related targets along its respective predictable pattern; and following detection of the first condition, detect a second condition including that a second portion of the gaze path through the virtual environment corresponds to the movement of a second one of the related targets along its respective predictable pattern, perform an action.

According to the subject matter of the present application, there may be provided a non-transitory computer-readable storage medium storing instructions that, when executed by a processor of a computer system cause the computer system to perform the above-described method.

In a particular example, there may be provided non-transitory computer-readable storage medium storing instructions that, when executed by a processor of a computer system cause the computer system to: display a stereoscopic rendering of a portion of a three-dimensional virtual environment including a plurality of related targets, each moving in a respective predictable pattern; update the displayed stereoscopic rendering based on movements tracked via a head tracker to show corresponding portions of the three-dimensional virtual environment along a gaze path through the three-dimensional virtual environment; detect a first condition including that a first portion of the gaze path through the virtual environment corresponds to the movement of a first one of the related targets along its respective predictable pattern; and following detection of the first condition, detect a second condition including that a second portion of the gaze path through the virtual environment corresponds to the movement of a second one of the related targets along its respective predictable pattern, perform an action.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 shows a wearable virtual reality device 100, exemplary of an embodiment.

The wearable virtual reality device 100 includes a body 110. The body 110 is shaped so as to allow a viewer to hold it up against their face above their nose such as in manners similar to holding a pair of goggles against one's face.

The wearable virtual reality device 100 includes a pair of viewports 120. A viewer may look through the viewports 120 with their eyes to view one or more internal displays (not shown) of the wearable virtual reality device 100. The viewports 120 may include lenses that may, for example, assist the viewer in focussing on the display. The spacing of the viewports 120 provides a separate view for each of the eyes of the viewer so as to provide for a stereoscopic separation, thereby allowing the viewer to experience a three-dimensional virtual reality environment.

Figure 2:
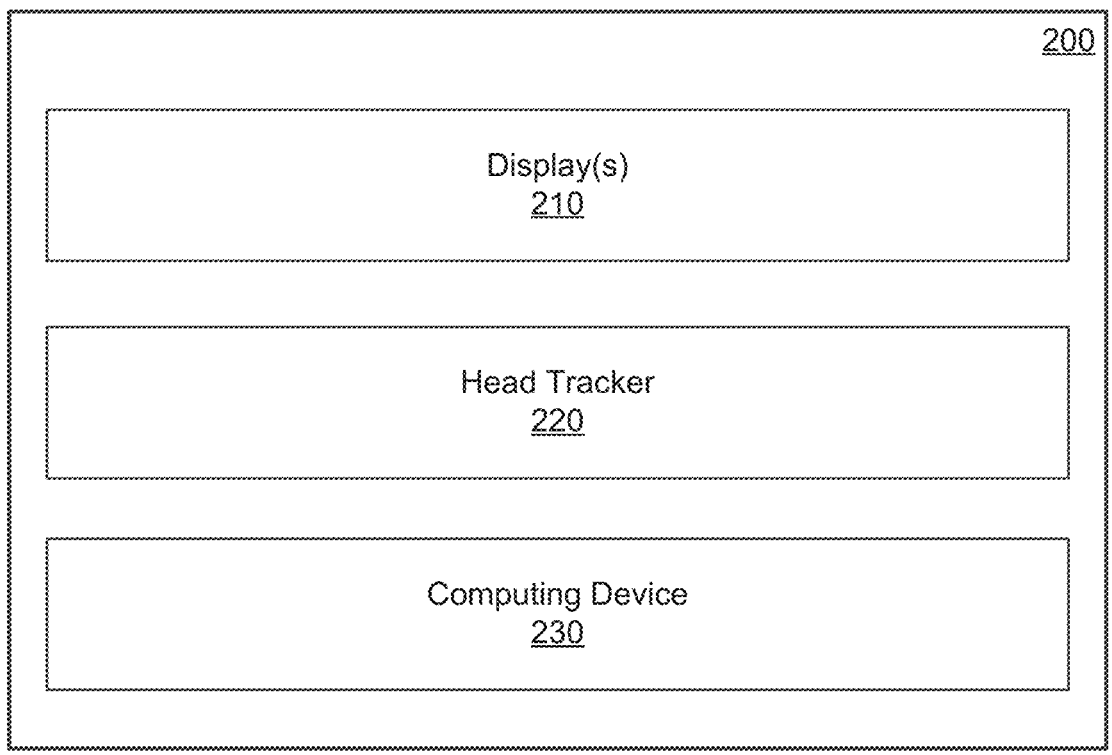
FIG. 2 is a simplified schematic diagram showing components of a virtual reality system.

FIG. 2 is a simplified schematic diagram showing components of a virtual reality system 200.

The virtual reality system 200 may, as shown, include one or more displays 210, a head tracker 220, and a computing device 230.

The one or more displays 210 are used to display images of a stereoscopic projection of a three-dimensional virtual environment to a viewer. In some embodiments, the one or more displays 210 may correspond to an internal display of a virtual reality device such as, for example, the wearable virtual reality device 100 (FIG. 1).

The head tracker 220 tracks the head of a viewer when the virtual reality system 200 is worn. For example, the head tracker 220 may track movements of the head of a viewer using, for example, one or more accelerometers, tilt sensors, and/or the like.

The computing device 230 is in communication with the one or more displays 210 and the head tracker 220. The computing device 230 may render the three-dimensional virtual environment presented to a viewer via the one or more displays 210. More particularly, the computing device 230 may render portions of the three-dimension virtual environment presented to a viewer for presentation via the one or more displays 210 based on movements of a viewer's head detected via the head tracker 220 as they look around the three-dimensional virtual environment.

In some embodiments, each of the components of the virtual reality system 200 may be mounted or integrated into a virtual reality device such as, for example, the wearable virtual reality device 100 (FIG. 1). Alternatively, it may be that components such as, for example, the one or more displays 210 and the head tracker 220 are integrated into the wearable virtual reality device 100 (FIG. 1), while others of the components such as, for example, the computing device 230 may be separately housed with the different components communicating via some communications link such as, for example, via wired or wireless connection(s) therebetween.

Figure 3:
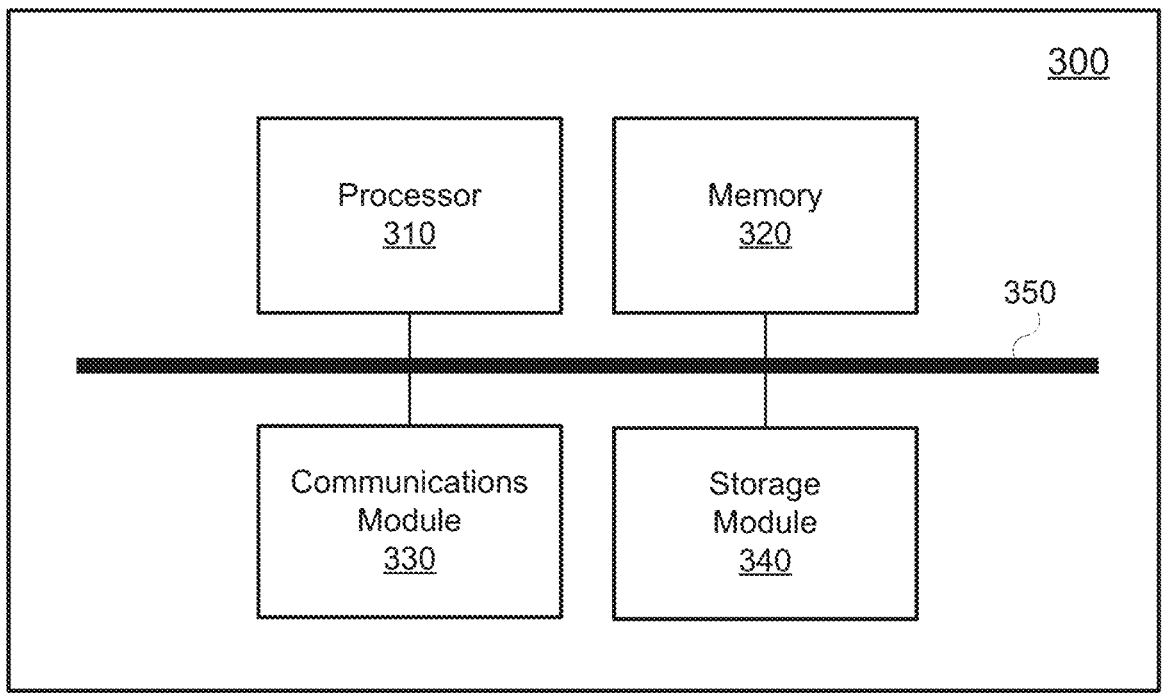
FIG. 3 is high-level schematic diagram of an example computing device.

FIG. 3 is a high-level operation diagram of an example computing device 300. In some embodiments, example computing device 300 may be exemplary of the computing device 230 (FIG. 2). As will be discussed in greater detail below, the computing device 230 (FIG. 2) includes software that adapts to the virtual reality system to provide functionality including receiving user input.

The example computing device 300 includes a variety of modules. For example, as illustrated, the example computing device 300 may include a processor 310, a memory 320, a communications module 330, and/or a storage module 340. As illustrated, the foregoing example modules of the example computing device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 300.

The communications module 330 allows the example computing device 300 to communicate with other computing devices and/or various communications networks. For example, the communications module 330 may allow the example computing device 300 to send or receive communications signals. Communications signals may be sent or received according to one or more protocols or according to one or more standards. For example, the communications module 330 may allow the example computing device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computing device 300 to communicate using near-field communication (NFC), via Wi-Fi™, using Bluetooth™ or via some combination of one or more networks or protocols. In some embodiments, all or a portion of the communications module 330 may be integrated into a component of the example computing device 300. For example, the communications module may be integrated into a communications chipset. In some embodiments, the communications module 330 may be omitted such as, for example, if sending and receiving communications is not required in a particular application.

The storage module 340 allows the example computing device 300 to be stored and retrieved. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
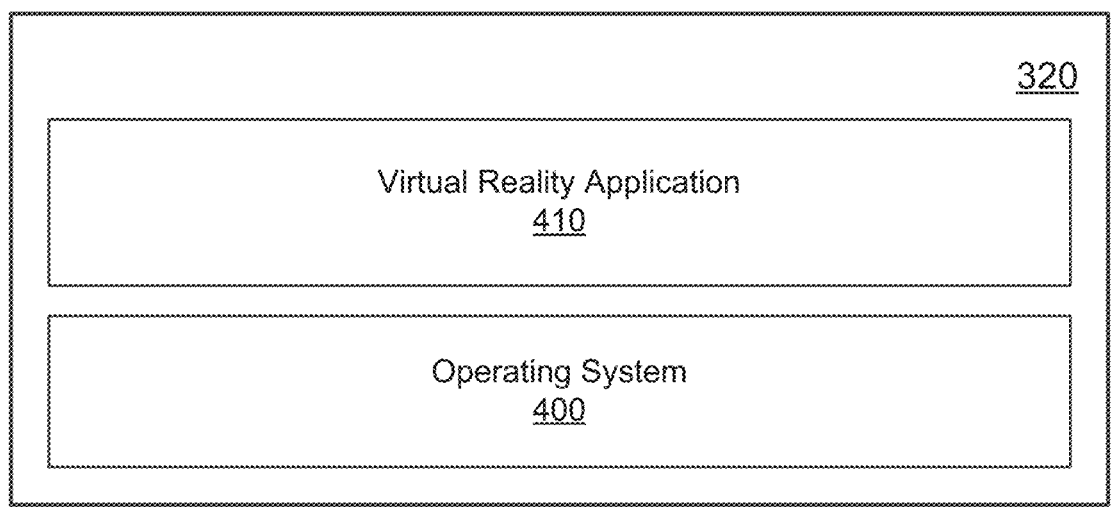
FIG. 4 shows a simplified organization of software components stored in a memory of the example computer device of FIG. 3.

FIG. 4 depicts a simplified organization of software components stored in the memory 320 of the example computing device 300 (FIG. 3). As illustrated, these software components include an operating system 400 and a virtual reality application 410.

The operating system 400 is software. The operating system 400 allows the virtual reality application 410 to access the processor 310 (FIG. 3), the memory 320, and the communications module 330 of the example computing device 300 (FIG. 3). The operating system 400 may be, for example, Google™ Android™, Apple™ iOS™, UNIX™, Linux™, Microsoft™ Windows™, Apple OSX™ or the like.

The virtual reality application 410 adapts the example computing device 300 (FIG. 3), in combination with the operating system 400, to operate as a device to provide a virtual reality experience and, in particular, to provide a three-dimensional virtual environment. In a particular example, the virtual reality application 410 may cooperate with the operating system 400 to adapt a suitable embodiment of the example computing device 300 (FIG. 3) to operate as the computing device 230 (FIG. 2).

The operation of the virtual reality system 200 (FIG. 2) in receiving input from a user of a virtual reality device and, more particularly, while the user is viewing a three-dimensional virtual environment via the one or more displays 210 (FIG. 2) of the virtual reality system 200, will now be described with reference to a flowchart 500 of FIG. 5. Operations 510 and onward are performed by one or more processors of the computing device 230 (FIG. 2), such as for example the processor 310 (FIG. 3) of a suitably configured instance of the example computing device 300 (FIG. 3), executing software such as, for example, a suitable instance of the virtual reality application 410 (FIG. 4).

As mentioned above, to provide a virtual reality experience, a three-dimensional virtual environment may be displayed via a display device such as, for example, by way of the one or more displays 210 (FIG. 2). The three-dimensional virtual environment may include a set of targets, each of the targets moving in a predictable pattern. As further described below, input may be provided by the viewer by moving their head so that their viewpoint tracks the movement of at least two of the moving targets along their respective predictable paths through the virtual environment.

As such, at the operation 510, there may be displayed, via the display device, a stereoscopic rendering of a portion of such a three-dimensional virtual environment including a group of related targets, each moving in a respective predictable pattern.

Figure 6:
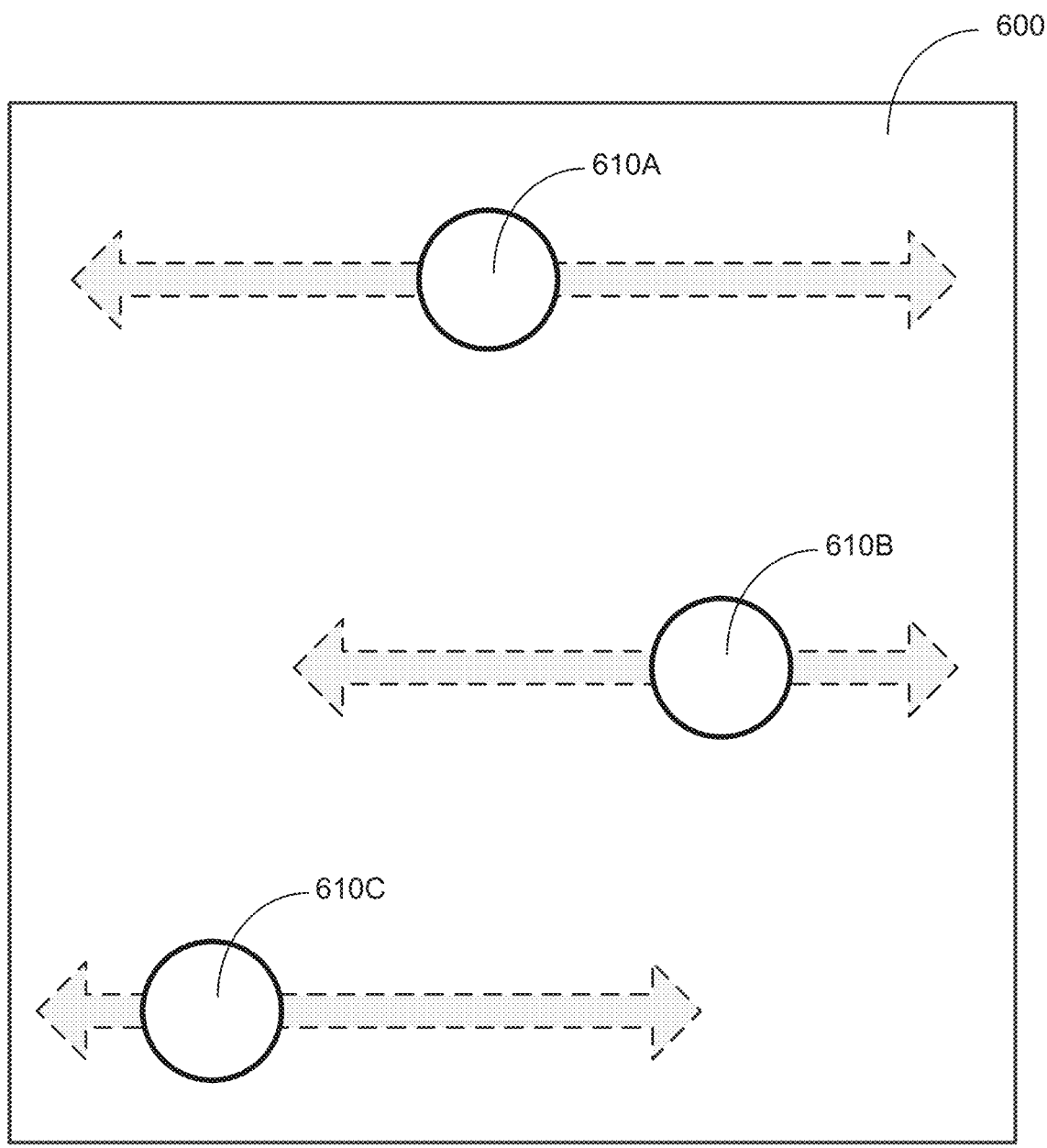
FIG. 6 shows how moving targets may be provided in a virtual reality environment.

An example of moving targets is shown in FIG. 6 which shows how moving targets may be provided in a virtual reality environment 600. As shown, a set of targets 610A, 610B and 610C may move back and forth along respective predictable paths through the virtual reality environment 600, the movements being illustrated in FIG. 6 by the stippled arrows underlying each of the targets 610A-C. (The stippled arrows are provided to show the direction of movement and may or may not included as a part of the actual display presented in the virtual environment 900.) The predictable path may, as illustrated, be a linear path in some examples. The path may be non-linear in some other examples. In some cases, a target may move is a reciprocating fashion back-and-forth along the length of a predictable path. In other cases, a target may move in a single direction along a predictable path, disappearing when it reaches one end of the path and reappearing at the other end to begin moving again. In other words, a target may, in such cases, appear to "wrap around" its path.

Returning to FIG. 5, from the operation 510, control flow proceeds to an operation 520.

As noted above, the rendering of the virtual environment may be updated in response to the detected movement of the virtual reality device. In other words, the rendering may be updated as the viewer moves their head to look around along some path through the three-dimensional virtual environment. Further, as noted, the viewer moving their head may be detected by way of a head tracker such as, for example, the head tracker 220 (FIG. 2).

As such, at the operation 520, the displayed stereoscopic rendering may be updated based on movements tracked via the head tracker to show corresponding portions of the three-dimensional virtual environment along a gaze path through the three-dimensional virtual environment.

From the operation 520, control flow advances to an operation 530.

At the operation 530, it is determined whether the gaze path corresponds to the movement of one of the moving targets. For example, if the moving targets are as illustrated in FIG. 6, it may be determined whether the tracked path of the viewer's head or, put differently, the gaze path through the three-dimensional virtual environment, corresponds to the movement of one of the targets 610A-610C. In a particular example, it may be determined whether a portion of the gaze path corresponds or correlated with the movement of one of the moving targets. For example, it could be that for such a correspondence to be identified with a given one of the moving targets, a portion of the gaze path has to track the path of that moving target in manners whereby that moving target is maintained in view or, perhaps even within a relatively fixed position (e.g. within some tolerance) in the rendered view during the time period corresponding to that portion of the gaze path. In other words, it may be that for a correspondence to be identified with a particular one of the moving targets, the movements of tracked by the head tracker corresponding to a portion of the gaze path must track the movements of the moving target along a corresponding portion of its movement path.

In some embodiments, it may be that, in order for a correlation between the gaze path and the path of a given one of the moving targets to be identified, the portion of the gaze path is required to track a corresponding portion of the path of the moving target across some minimum distance in the virtual environment, to track the path of the moving target for some minimum time, or a combination thereof. In this way, accidental or short glances may be excluded from detection. Conveniently, excluding accidental and/or short glances from detection may increase the reliability of input detection.

Furthermore, it may, additionally or alternatively, be that, in order for a correlation between the gaze path and the path of a given one of the moving targets to be identified, the gaze path is only required to tracks the movement path of that moving target within some tolerance—i.e., that correspond within some tolerance. In this way, minor deviations within a correlated portion of the gaze path from a correlated portion of the path of the moving target may be disregarded. Such a tolerance may, in some embodiments, be configurable. In this way, the degree of deviation that will be accepted may be configurable. Furthermore, whether or not the tolerance is configurable, a tolerance may be chosen based considerations such as, for example, the particular application to which the present method is applied. For example, because a tighter (i.e., lower) tolerance may further reduce the likelihood of inadvertent detection of a condition (and therefore, potentially, the likelihood of inadvertent detection of input), a tighter tolerance may be selected where avoidance of inadvertent detection is a particularly heightened consideration. By contrast, because a greater tolerance may make it easier to provide input but may also increase the risk of inadvertent detection of a condition (and therefore, potentially, the likelihood of inadvertent detection of input), a greater tolerance may be selected for applications where this is a lesser concern as compared to, for example, the ease of providing input. For example, an overly tight tolerance could make it difficult for persons identifying with disability such as, for example, those affected by certain movement disorders, to provide input. Notably, however, because, as further described below, the detection of input according to the present method includes detection of multiple conditions, it may be that, regardless of the particular tolerance selected, the overall risk of inadvertent input detection can be mitigated by employing the present method in a given application.

If the first condition is detected—i.e. that the path through the virtual environment corresponds to the movement of a first one of the related targets along its respective predictable pattern—then control flow advances to an operation 540. Otherwise, control flow returns to the operation 520.

At the operation 540, is determined whether, following detection of the first condition at the operation 530, as movements continue to be tracked by the via the head tracker and the rendering correspondingly updated along the continued gaze path through the three-dimension virtual environment, whether a second portion of the gaze path further corresponds to the movement of a second one of the related targets along its respective predictable pattern. This may be referred to as a detecting a second condition.

Notably, the second portion of the gaze path is a portion of the gaze path following the above-mentioned portion of the gaze path. Further, in at least some embodiments, it may be that such first and second portions of the gaze path are required not to overlap.

Further, it is noted that one or more of the above considerations as to when a correlation between a portion of the gaze path and the movement of a target along its respective predictable pattern may equally, additionally or alternatively, apply to identifying a correlation between the second portion of the gaze path and the movement of another of the related targets.

If the second condition is met—e.g., the gaze path through the virtual environment and, in particular, a second portion thereof, further corresponds to the movement of another of the related targets along its respective predictable pattern through the three-dimensional virtual environment—then an input has been detected and control flow advances to an operation 550. In other words, detecting the first condition and subsequently detecting the second condition causes detection of an input condition—i.e., an input command is deemed received. Otherwise, control flow returns to the operation 520.

Figure 5:
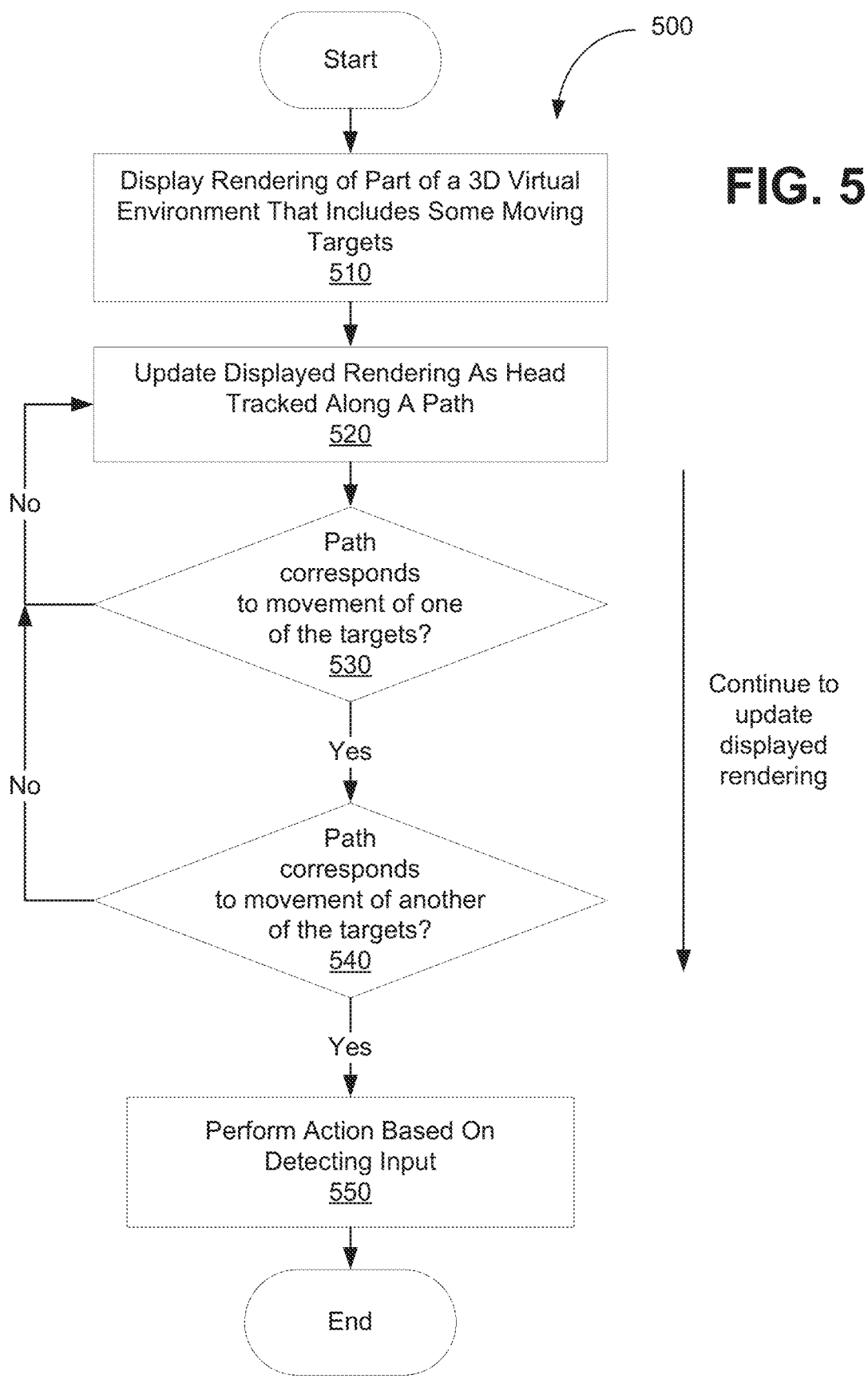
FIG. 5 is a flowchart showing operations in detecting input based on head tracking relative to moving targets.

It is noted that, as shown in FIG. 5, the displayed rendering will continue to be updated following the operation 520, as the virtual reality device is tracked throughout the processing of at least operations 530 and 540.

At the operation 550, an action may be performed responsive to the input. The nature of the action may vary dependent upon, for example, the application to which the present method is applied. The action may also vary within a given application dependent on the current context—e.g., state of operation—of the application. Example actions are described below in relation to example application of the technique of FIG. 5. For example, performing the action may include presenting a video in the three-dimensional virtual environment.

Conveniently, the technique of FIG. 5 may be resilient to accidental or inadvertent detection of input due to the requirement to detect movement corresponding to multiple ones of the moving targets.

In some applications, it may be that a gaze path corresponding to additional ones (e.g., a total of 3, 4, 5, etc. . . . ) of the moving targets may be required. Additionally or alternatively, it may be that a gaze path corresponding to a path of a first one of the moving targets, then another one of the moving targets, and then, perhaps, yet another of the moving targets including, potentially, the first one of the moving targets, may be required to detect input. More broadly, it may be that portions of the gaze path are required to correspond, respectively, to movements of multiple ones of the targets for total of a specified number of such correspondences, with a requirement that different ones of the moving targets being followed is required between immediately successive ones of the followed targets. In any event, it may be that the higher the number of times portions of the gaze path must correspond to paths of respective, different, successive moving targets, then the lower the likelihood the input will be inadvertently triggered or detected.

Further it is noted that, where movement corresponding to additional ones of the moving targets is required, above-mentioned considerations as to when a correlation between a portion of the gaze path and the movement of a target along its respective predictable pattern could also apply to detecting such correspondence.

Additionally or alternatively, it may be that, in some embodiments, multiple sets or groups of moving targets are provided with each of the targets in a group being related. Such multiple groups may correspond to different input values. As such, input detected based on movements corresponding to targets of one group may result in different action being taken (e.g. as at the operation 550) as compared to the targets of another group.

Additionally or alternatively, in some embodiments, targets involved in detection of a condition at the operation 530 and/or the operation 540 may disappear. Additionally or alternatively, some other indication that a condition has been detected may be provided such as, for example, by way of audio, visual, and/or haptic feedback.

Notably, the techniques of FIG. 5 and the above-described possible variations thereof may serve to avoid inadvertent and/or incorrect detection of input. In some embodiments, an input device (not shown) may be provided and used in order to further ensure input is reliably detected when intended. In a particular example, an input device provided as a part of the virtual reality system 200. Such an input device may, for example, include a touch sensitive surface or a key or switch. Where such an input device is provided (i.e., as a part of the virtual reality system 200 or in addition to it), a confirmatory input, received by way of the input device, may be required concurrent with or at some time proximate to detection of movements along the path corresponding to a particular one of the targets in order for a condition at the operation 530 and/or the operation 540. Put differently, absent such input control flow from the operation 530 and/or the operation 540 may return to the operation 520/the operation 530, respectively, rather than advancing to the operation 530/the operation 550, respectively, even if the path corresponds to the movement of a target. In other words, it may be that detecting at least one of the input detection conditions may further include detecting a confirmatory input via the input device. In some embodiments, an indication (visual, audio, haptic, combinations thereof, etc.) that such confirmatory input has been received may be provided.

As noted above, the input device may take a variety of forms and, consequently, so may detecting the confirmatory input. For example, detecting the confirmatory input may correspond to detecting a touch, a keypress, or voice input.

An alternate embodiment of a virtual reality device will now be described with reference to FIGS. 7A and 7B.

Figure 7A:
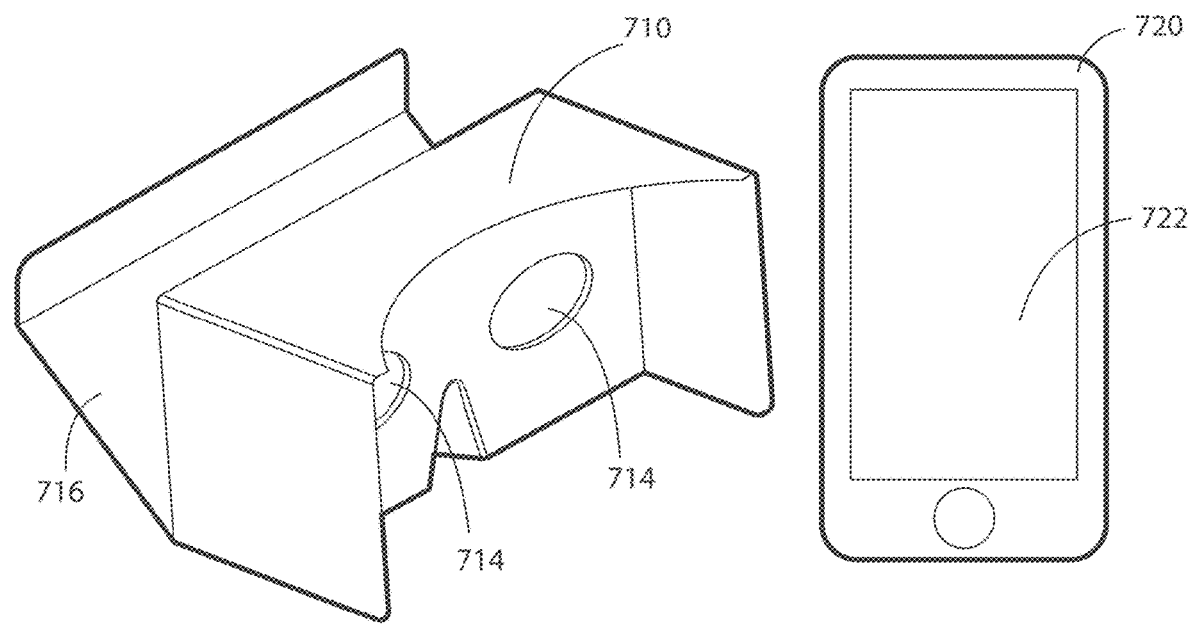
FIGS. 7A and 7B show a wearable virtual reality device, exemplary of another embodiment, with the device in partially assembled and assembled states, respectively.
Figure 7B:
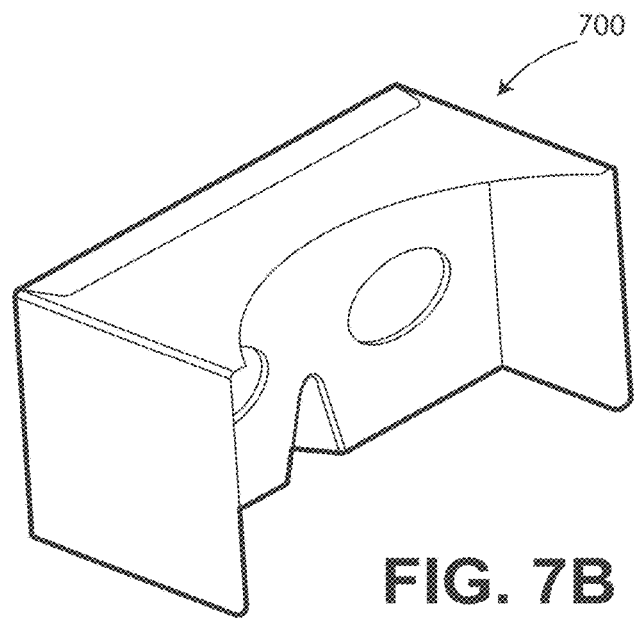

As best shown in FIG. 7A, a virtual reality device 700 may be formed using a kit consisting of a frame 710 and a smartphone 720. The smartphone 720 may be inserted into a compartment or cavity with a screen 722 of the smartphone 720 facing towards a pair of viewports 714. A rear door 716 of the frame 710 may then be closed as shown in FIG. 7B. As such, the virtual reality device 700, when assembled, includes a virtual-reality headset frame (the frame 710) and the smartphone 720 which mounted in the frame 710. Notably, the virtual reality device 700 may be worn or donned such as, for example, by holding it up to or mounting it against the face of a user. As such, the virtual reality device 700 may be considered a wearable virtual reality device.

The frame 710 may be made of a variety of materials such as, for example, cardboard or a suitable plastic such as, for example, ethylene-vinyl acetate (EVA). Further, it may be that plastic or glass lenses are provided at the viewports 714. In a particular example, the frame 710 may be a Google™ Cardboard frame or similar.

Conveniently, the virtual reality device 700 may provide functionality similar to that as may be provided by the wearable virtual reality device 100 (FIG. 1) and/or the virtual reality system 200 (FIG. 2) may be provided. For example, the viewports 714 may be analogous to the viewports 120 (FIG. 1) of the wearable virtual reality device 100 (FIG. 1). In another example, the screen 722 may provide images similar to how images may be provided by the one or more displays of the virtual reality system 200 or the display of the wearable virtual reality device 100. Further, the smartphone 720 may include an accelerometer. Notably, where the virtual reality device 700 is worn on the head of a user, the accelerometer of the smartphone 720 may register movement of the user's head and, therefore, may provide functionality similar to the head tracker 220 of the virtual reality system 200. For example, the user could wear the virtual reality device 700 (FIG. 7) by pressing it against their face and holding it in place with their hands as they look through it and have movements of their head registered by such an accelerometer. Additionally, smartphone 720 is a computing device and may, therefore, serve a similar purpose and potentially provide similar functionality to the computing device 230 of the virtual reality system 200.

Figure 8:
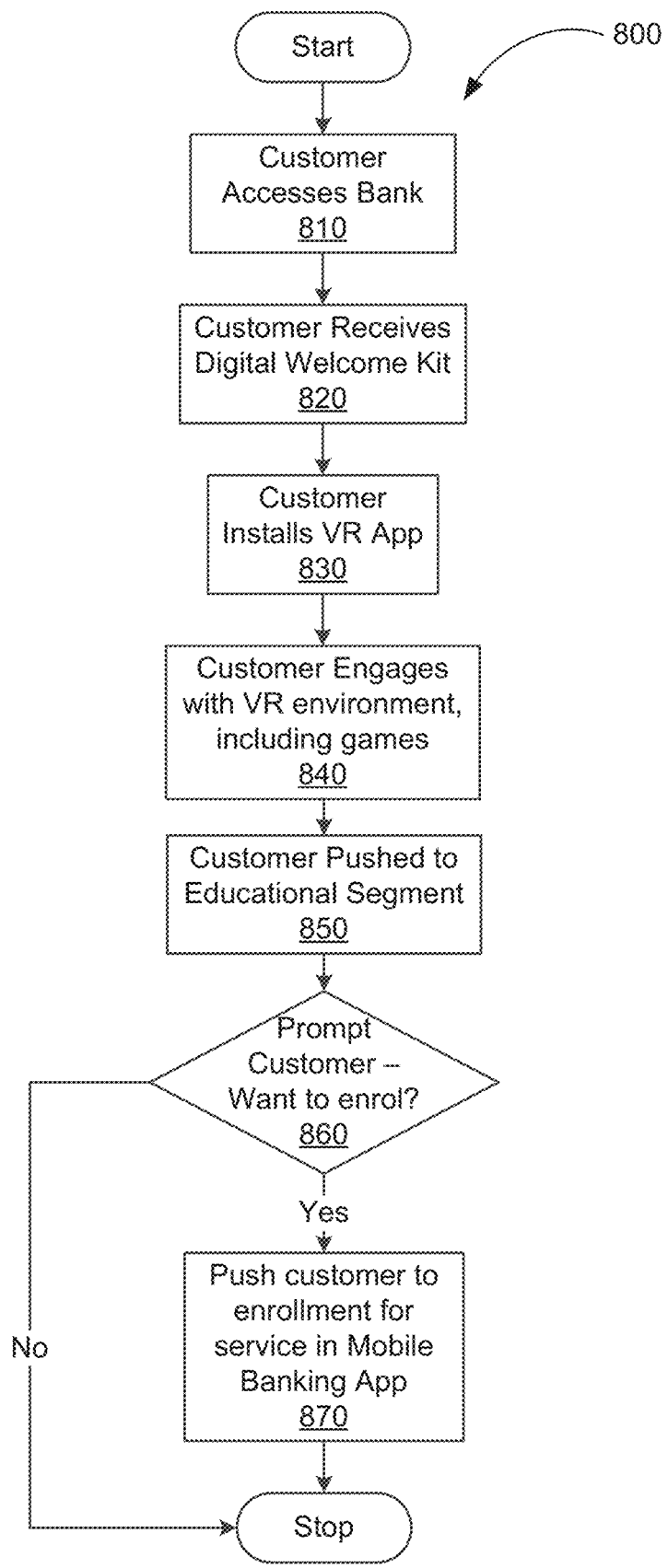
FIG. 8 is a flowchart showing operations as may be involved in providing a platform, including a virtual-reality application that may utilize the subject matter of the present application.
Figure 9:
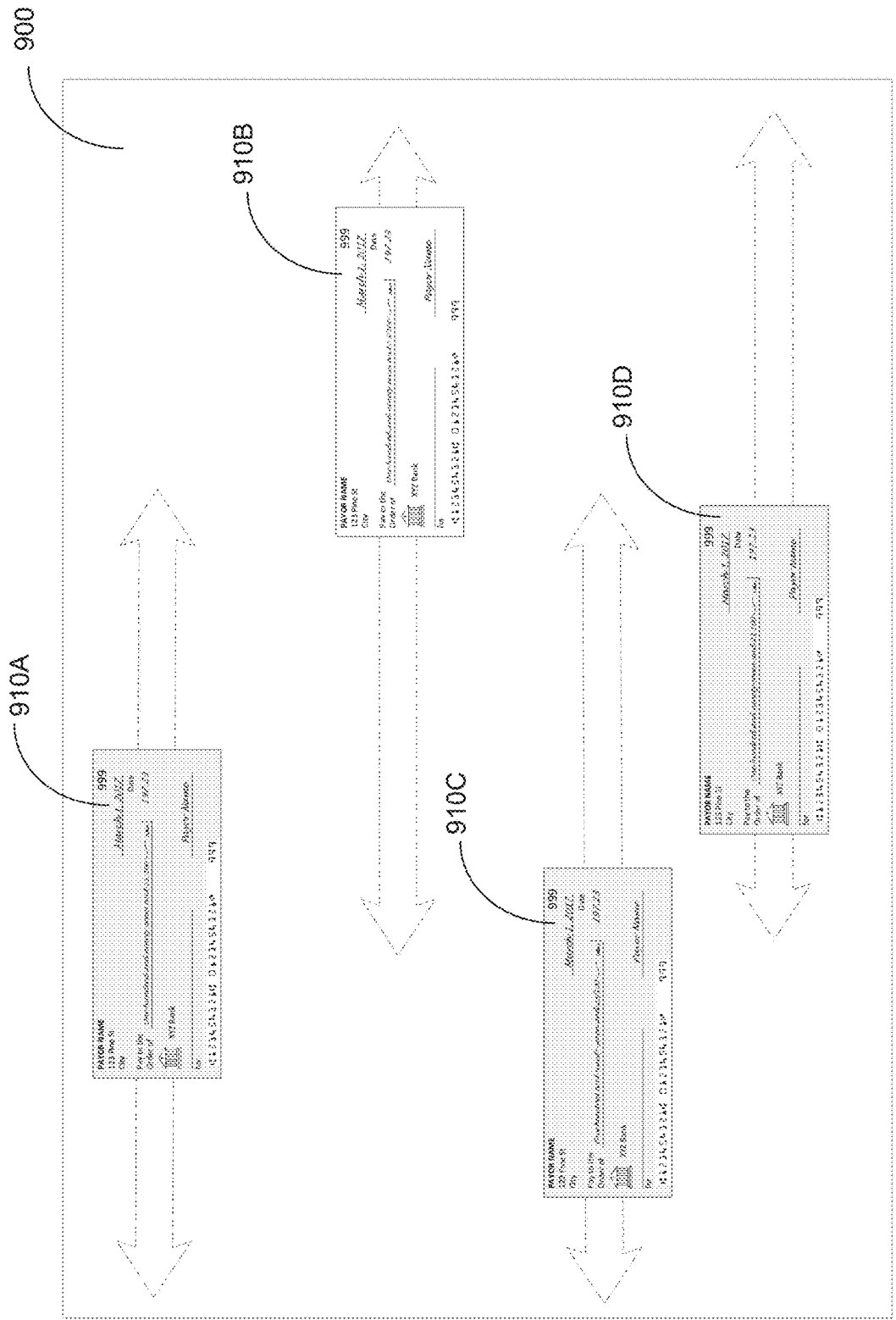
FIG. 9 shows moving targets as may be provided in a virtual reality environment as a part of the virtual-reality application of FIG. 8.

An example application of the subject matter of the present application and, in particular, the above described techniques for detecting input, will now be described with reference to FIGS. 8 and 9.

By way of overview, applications can provide various categories of functionality. Users may need to discover or learn about such functionality in order to use it. However, in some cases users may not, based on existing means and resources, easily and/or quickly learn all of the functionality a given app has, how to use those features, or even when they can properly be employed. Additionally, because of the work to discover functionality, users may not identify available functionality or may become overwhelmed.

In the case of banking applications, the functionality provided can be particularly diverse. Currently, banking customers may rely on resources such as, for example, frequently-asked question lists (FAQs), tutorials, or pop-ups/full-screen tips or advertisements (e.g., interstitial tips or advertisements), in order to discover or learn about functionality in banking apps such as, for example, mobile or desktop banking applications. However, as in the more general case, not all users may be successful in discovering all functionality of a given banking app, how to use those features, or even when they can properly be employed.

In order to allow banking application features to be discovered or enrolled in, an augmented or virtual reality platform ("virtual reality platform") may provide education about and/or enrollment in particular banking features. An example of how a customer may be provided with such a platform and the functionality it offers will now be described with reference to a flowchart 800 of FIG. 8. In particular, an example process that may be followed in providing such a platform to a customer and then enrolling the customer in banking functions by way of that platform will now be described.

At a step 810, a customer may access a bank by way of some banking channel. For example, the customer may visit a bank branch, may use an online or mobile banking application, and/or may visit the bank website. In any event, the customer may use the channel to sign-up or somehow enroll in the virtual reality platform. For example, enrollment may be a side-effect of opening a new account or signing up for a new product or service. Alternatively, the customer may simply request to be provided with the materials necessary to use the virtual reality platform.

Next, at a step 820, the customer may receive a digital welcome kit that may include materials they will use in accessing the virtual reality platform. The customer may receive a virtual reality headset or a portion thereof. For example, the customer may receive a virtual-reality headset frame such as, for example the frame 710, for use with their own mobile device. In a particular example, the customer may be provided with a Google™ Cardboard frame which may, in some cases, be branded to the bank and/or may include instructions for use such as with the virtual reality platform. The customer may receive the digital welcome kit by mail or in-person. For example, if a customer visits a bank branch as a part of step 810, the kit may be provided to them at the branch.

Next, at a step 830, the customer may install an application for providing the virtual reality platform on their mobile device. Notably, the customer may follow instructions or guidance provided with the digital welcome kit in order to install the application.

Next, at a step 840, the application installed at the step 830 is launched. The customer may also place their mobile device in a provided frame and may don the resultant virtual reality headset such as, for example, by holding it up to their eyes. As further described below, the customer will, by way of the virtual reality headset, "enter" a virtual reality/augmented reality which will provide the customer with elements related to the bank such as, for example, information, games, trivia, puzzles, etc. related to bank services.

Next, following interaction with the elements and based on received input, the customer may, at a step 850, be provided with an educational segment such as, for example, videos, promotional information, or the like in order to educate the customer on a particular service type, different applications thereof, or the like. In a particular example, 360-degree videos may be provided. As further described below, the provided educational segment, video or otherwise, may correspond to functionality in which the customers can choose to enroll. Notably, the particular educational segment provided may be based on the input.

As further described below, the subject matter of the present application and, in particular, the above-described techniques for receiving input, may be employed at least at the steps 840, 850 for receiving input.

Following the educational segment, at a step 860, an indication may be displayed asking the customer whether they wish to enroll in the type of service highlighted in the educational segment. Input is received responsive to the indication. For example, the input may, in some embodiments, be received by way of one or more of the above-described techniques for receiving input. In any event, if the received input indicates the customer would like to enrol, the app may cause a user interface for enrolling in the highlighted type of service to be provided.

For example, a prompt may be displayed in the virtual environment asking whether the user wishes to initiate enrolment in the particular functionality that was featured in the educational segment. If so, then, in response to the prompt the user may, at a step 870, provide some indication that enrolment in that functionality is to be initiated. If such an indication is received in response to the prompt then, upon receiving the indication, enrolment in the particular functionality may be initiated. In a particular example, the customer may, as shown in FIG. 8, at the step 870, be directed to service enrollment functionality by launching a software application such as, for example, a mobile banking application on the mobile device. The mobile banking application may, once started, launch enrollment functionality for the highlighted service. For example, the virtual reality application may cause such functionality to be launched by using "deep linking" functionality that allows users another software application on the mobile device to be launched so as to open directly to a particular page or portion of the mobile banking application. The mobile banking application may automatically provide an enrollment workflow when a user is linked to a feature for which they have not yet enrolled. Accordingly, directing the mobile banking application to link to the feature for which a desire to enroll was indicated may cause the mobile banking application to provide the desired enrollment experience. If, however, the user has already enrolled for that feature, they may be provided with access to that feature. Alternatively, an error message could be provided.

In some embodiments, it may be that, following the educational segment, rather than displaying an indication asking the customer whether they wish to enroll in the type of service highlighted in the educational segment, enrolment is performed automatically (i.e., executed without requiring user input). For example, it may be that enrolment in particular service (or services) does not require confirmation before enrolling. Alternatively, it may be that enrolment is performed automatically unless authentication is required—i.e., the user is only asked if they wish to enroll if authentication is needed before enrolling. For example, if authentication is not required to enroll in a particular service or if the user is already authenticated, then no confirmation may be provided. Once enrolment is completed, the user may be provided with an indication that they are enrolled in the service.

In some embodiments, one or more of the targets may be moving alone determined paths while others of the targets may be static (not moving). It may, for example, be the first or second condition may be detected if a user gazes at (i.e., looks at) one of the static targets. For example, it could be that the first condition is detected based on a gaze path corresponding to one of the moving targets while the second condition is detected based on a gaze path intersecting or dwelling on a static target or vice-versa.

Where the virtual reality experience is provided by a first, dedicated application that relies on a second separate application such as, for example, a mobile banking application to provide enrollment functionality, it may be that the virtual reality application does not involve, receive and/or manipulate Personally Identifiable Information (PII) as PII may only be required at enrollment. Conveniently, an application that does not involve, receive, or manipulate PII may be less burdensome to produce and/or maintain such as, for example, due to reduced privacy and/or security risks as compared to an application that involves, receives, and/or manipulates PII.

As mentioned above, techniques for receiving input as described above may be employed such as at the steps 840 and 850.

For example, as noted above, elements related to particular bank services may be provided. Notably, the above-described techniques for receiving input may be employed in relation to such elements. More particularly, it may be that, as mentioned above, the elements include one or more games. FIG. 9 shows an example of a series of moving targets may be provided in a virtual environment 900 as a part of such a game.

As illustrated, moving targets 910A, 910B, 910C, 910D may move back-and-forth along paths denoted by stippled arrows. (The stippled arrows are provided to show the direction of movement and may or may not included as a part of the actual display presented in the virtual environment 900.)

The moving targets 910A-910D may be part of a "shooting gallery"-type game. Such a game may include multiple hovering targets moving in predictable patterns in the virtual environment 900. The moving targets 910A-910D may be themed to correspond to particular banking features or functionality. More particularly, the moving targets 910A-910D may be themed to correspond to particular functionality available for enrolment. For example, the moving targets 910A-910D may, as illustrated, be hovering cheques which may, potentially, correspond to a mobile cheque deposit feature available from the bank. In another example, the moving targets could be themed to correspond to other banking features. For example, the moving targets could be themed as mobile devices to correspond to a mobile money transfer feature.

In the game, a user may, by having moving their head to track a particular cheque for a defined period "scan" a given one of the cheques, akin to how a cheque may be scanned with a user's mobile device for mobile deposit. Once a cheque is scanned, it may disappear from the virtual environment 900. Additionally or alternatively, a user may be provided with audio, visual and/or haptic feedback. For example, a sound or animation may be provided, a display may be updated to reflect accrual of a score in the game, and/or the mobile device may be made to "buzz" to provide haptic feedback such as, for example, by way of a vibration module of the mobile device. The user wins the game by scanning a sufficient number (e.g., 3) of the cheques. As result of their win, an educational segment related to the banking functionality featured in the game—i.e., mobile cheque deposit—may be triggered and the user, in turn, later choose to enroll in that functionality in manners described above.

Notably, the above game has been defined to provide mechanics corresponding to the above-described techniques for receiving input. In particular, as a user "scans" cheques by moving their head (the movements being tracked via a head tracker of the virtual reality device such as, for example, an accelerometer of the mobile device), they will move their head along a path corresponding to a target moving in a predictable pattern and a condition (scanning the cheque) will be detected. As such a condition is detected in relation to two or more of the moving cheques, input will be detected or, in other words, the user will "win" the game. As a result of the detection of the input (and, therefore, as a result of the win), an action will be performed, namely the provision of the educational segment.

As mentioned above, the above-described techniques for receiving input may also, in some embodiments, include receiving confirmatory by way of an input device. In some embodiments, an element may use such embodiments of the input techniques. In a particular example if, as mentioned above, a mobile-money-transfer-related game is being provided, input such as, for example, tapping a screen of the mobile device, may be required as confirmatory input for the detection of a condition. In terms of the game, such an input may be considered akin to a "fire" button in a video game. Notably, whenever such input is received feedback, such as, for example, visual, audio, or haptic feedback or combinations thereof may be provided. In a particular example, an animation could be provided in the virtual environment showing cash or money being "shot" at the moving targets, with the position and/or path of the fired "shot" (e.g., the cash or money) being based on movements tracked via the head tracker of the virtual device. If the "fire" input is provided at a suitable time so as to strike a particular target, then a condition may be indicated. Feedback that the condition has been detected may be provided such as, for example, by making the particular target disappear from the virtual environment. Again, once at least two conditions have been detected or, in other words, once at least two targets have been hit, then an action will be performed, namely the provision of a suitable education segment. Notably, such a game also corresponds to one or more of the above-described techniques for receiving input.

The above described embodiments are merely by way of example and may be susceptible to one or more variations. For example, the above-described techniques for receiving input may be employed in other applications and in other industries other than banking. In a particular example, a virtual reality platform for enrolment may be provided in manners similar to that described above with reference to FIGS. 8 and 9 for enrolment in services other than banking services.

In some embodiments, a virtual reality device may include an eye tracker in addition or as an alternative to the head tracker. More particular, it may be that such an eye tracker is employed to track the eyes of a wearer as the look around a virtual environment. A gaze path may be determined based on such eye tracking, either based on eye tracking data alone or by combining it with other tracking data such as, for example, tracking data from a head tracker. Conveniently, it may be that by combining eye tracking and head tracking data, the accuracy of the gaze path can be improved.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
a processor;
a wearable virtual-reality device coupled to the processor, the virtual-reality device including a display device and a head tracker; and
a memory coupled to the processor storing instructions that, when executed by the computer system, cause the computer system to:
display, via the display device, a stereoscopic rendering of a portion of a three-dimensional virtual environment including a plurality of related targets, each moving in a respective predictable pattern;
update the displayed stereoscopic rendering based on movements tracked via the head tracker to show corresponding portions of the three-dimensional virtual environment along a gaze path through the three-dimensional virtual environment;
detect a first condition including that a first portion of the gaze path through the virtual environment corresponds to the movement of a first one of the related targets along its respective predictable pattern; and
following detection of the first condition, cause the first one of the related targets to disappear from the virtual environment, and detect a second condition including that a second portion of the gaze path through the virtual environment corresponds to the movement of a second one of the related targets along its respective predictable pattern, and perform an action, wherein the first one of the related targets is a different target than the second one of the related targets.

2. The system of claim 1 wherein detecting that the first portion of the gaze path corresponds to movement of the first one of the related targets includes determining that the first one of the related targets was maintained in view in the displayed stereoscopic rendering during a time period corresponding to the first portion of the gaze path.

3. The system of claim 2 wherein detecting that the first portion of the gaze path corresponds to movement of the first one of the related targets further includes determining that the time period corresponding to the first portion of the gaze path is of at least a minimum duration.

4. The system of claim 1 wherein detecting that the first portion of the gaze path corresponds to movement of the first one of the related targets includes determining that the first portion of the gaze path corresponds to a minimum distance in the three-dimensional virtual environment.

5. The system of claim 1 wherein detecting a correlation between the first portion of the gaze path and the movement of the first one of the related targets including detecting that the first portion of the gaze path and the movement of the first one of the related targets correspond within a tolerance.

6. The system of claim 5 wherein the tolerance is configurable.

7. The system of claim 1 wherein the first portion of the gaze path and the second portion of the gaze path do not overlap.

8. The system of claim 1 wherein the wearable virtual-reality device further includes an input device and wherein detecting at least one of the first and second conditions further includes detecting a confirmatory input via the input device.

9. The system of claim 8 wherein detecting the confirmatory input corresponds to detecting at least one of a touch, a keypress, and a voice input.

10. The system of claim 1 wherein performing the action includes presenting a video in the three-dimensional virtual environment.

11. The system of claim 10 wherein the video corresponds to functionality available for enrolment.

12. The system of claim 1 wherein the instructions, when executed by the computer system, further cause the computer system to:
   display, via the display device, a prompt as to whether to initiate enrolment in particular functionality;
   in response to the prompt, receive an indication to initiate enrolment in the particular functionality; and
   upon receiving the indication, initiate enrolment in the particular functionality.

13. The system of claim 12 wherein the three-dimensional virtual environment is provided via a first software application and wherein enrolment in the particular functionality is provided via a second software application.

14. The system of claim 13 wherein the second software application includes a mobile banking application.

15. The system of claim 14 wherein each of the plurality of related targets is themed.

16. The system of claim 15 wherein the theming corresponds to the particular functionality available for enrolment.

17. The system of claim 1 wherein the wearable virtual-reality device includes a virtual-reality headset frame and a smartphone mounted in the frame.

18. A computer-implemented method comprising:
   displaying, via a display device of a wearable virtual-reality device, a stereoscopic rendering of a portion of a three-dimensional virtual environment including a plurality of related targets, each moving in a respective predictable pattern;
   updating the displayed stereoscopic rendering based on movements tracked via a head tracker of the virtual-reality device to show corresponding portions of the three-dimensional virtual environment along a gaze path through the three-dimensional virtual environment;
   detecting a first condition including that first portion of the gaze path through the virtual environment corresponds to the movement of a first one of the related targets along its respective predictable pattern; and
   following detection of the first condition, causing the first one of the related targets to disappear from the virtual environment, and detecting a second condition including that a second portion of the gaze path through the virtual environment further corresponds to the movement of a second one of the related targets along its respective predictable pattern, and performing an action, wherein the first one of the related targets is a different target than the second one of the related targets.

19. The method of claim 18 wherein detecting that the first portion of the gaze path corresponds to movement of the first one of the related targets includes determining that the first one of the related targets was maintained in view in the displayed stereoscopic rendering during a time period corresponding to the first portion of the gaze path.

20. A non-transitory computer-readable storage medium storing instructions that, when executed by a processor of a computer system cause the computer system to:
   display a stereoscopic rendering of a portion of a three-dimensional virtual environment including a plurality of related targets, each moving in a respective predictable pattern;
   update the displayed stereoscopic rendering based on movements tracked via a head tracker to show corresponding portions of the three-dimensional virtual environment along a gaze path through the three-dimensional virtual environment;
   detect a first condition including that a first portion of the gaze path through the virtual environment corresponds to the movement of a first one of the related targets along its respective predictable pattern; and
   following detection of the first condition, cause the first one of the related targets to disappear from the virtual environment, and detect a second condition including that a second portion of the gaze path through the virtual environment corresponds to the movement of a second one of the related targets along its respective predictable pattern, and perform an action, wherein the first one of the related targets is a different target than the second one of the related targets.

* * * * *